United States Patent [19]

Yokota et al.

[11] 4,363,538

[45] Dec. 14, 1982

[54] DEVICE FOR HOLDING A FILM ON A FOCAL PLANE

[75] Inventors: Masazi Yokota; Shigenori Oosaka, both of Asaka, Japan

[73] Assignee: Fuji Photo Film Co., Ltd., Minami-ashigara, Japan

[21] Appl. No.: 145,241

[22] Filed: Apr. 30, 1980

[30] Foreign Application Priority Data

May 2, 1979 [JP] Japan .................................. 54-54412

[51] Int. Cl.$^3$ .......................... G03B 21/14; G03B 1/48
[52] U.S. Cl. ................... 353/95; 353/26 R; 352/222
[58] Field of Search ............ 353/60, 61, 95, 96, 353/26 R, 26 A; 352/146, 147, 222, 224; 355/76, 73

[56] References Cited

U.S. PATENT DOCUMENTS 2,174,660 10/1939 Hirsch ................................. 353/96
3,267,801 8/1966 Abbott et al. ................... 353/60 X
3,400,995 9/1968 Borberg et al. ................. 353/60 X
3,645,621 2/1972 Wally ................................ 353/95 X

FOREIGN PATENT DOCUMENTS 1018629 10/1952 France ............................... 352/222
38-20689 7/1963 Japan ................................ 352/222
576764 4/1946 United Kingdom ............... 352/222
1037093 7/1960 United Kingdom ............... 355/76

Primary Examiner—Harry N. Haroian
Attorney, Agent, or Firm—Fleit & Jacobson

[57] ABSTRACT

A photographic film like a microfilm is maintained on a focal plane by suction. A film support having a vacuum suction holes is made of a drafty material to allow draft while the film is maintained flat on the surface thereof by suction. Further, the film support has cushion to protect the film from scratches. Thus, the film can be fed on while being kept flat on a focal plane on the film support.

8 Claims, 4 Drawing Figures

DEVICE FOR HOLDING A FILM ON A FOCAL PLANE

BACKGROUND OF THE INVENTION

1. Field of the Invention

This invention relates to a device for holding a film on a focal plane, and more particularly to a device for holding a photographic film on a focal plane of an optical system like a microfilm in a microfilm camera or a microfilm reader.

2. Description of the Prior Art

In a microfilm camera or reader, the microfilm must be held accurately on the focal plane of the optical system thereof. In order to hold the microfilm on the focal plane, it has been known in the art to use a film pressure plate or a device utilizing the curl or solidity of the film. However, the pressure plate is disadvantageous in that the film is liable to be scratched when it is fed therethrough, and the device utilizing the solidity of the film is unreliable in operation.

In view of the disadvantages of the above mentioned devices, it has been proposed to utilize suction for holding the microfilm on a film support plate located on the focal plane. The suction device holds the film by suction on the plate while the film is to be held on the focal plane during exposure or projection and sets the film free when it is to be fed. This method of holding the film on the focal plane comparatively accurately holds the film on the focal plane, but is slow in operation since the turn ON and OFF of the system are controlled by an electromagnet or the like.

SUMMARY OF THE INVENTION

The primary object of the present invention is to provide a device for accurately holding a film on a focal plane with high efficiency.

A more specific object of the present invention is to provide a device for accurately holding a microfilm on a focal plane of a microfilm camera or reader which utilizes suction means and has high efficiency and speed.

The film holding device in accordance with the present invention is characterized in that the film is able to be fed without turning off the suction system so that the suction system may not be turned on and off in operation to enhance the work efficiency of the microfilm camera or reader.

In more detail, the device for holding a film on a focal plane in accordance with the present invention is composed of a film support plate having a standard surface being parallel to the focal plane, a cushion sheet provided on the standard surface of the film support plate having a soft, elastic and drafty surface and having one or more suction holes opened on the surface thereof to be put into contact with the film, and a suction means for sucking the film through the suction holes and attracting the film onto the surface of the cushion sheet with a suction force sufficient to hold the film flat on the surface of the cushion sheet and small enough to allow the film to be fed being pulled by a film feeding means.

In accordance with the device for holding a film on a focal plane of this invention as mentioned above, the film can be accurately held on the focal plane and can be fed even while the film is held on the focal plane by suction. In other words, the film can be fed without turning off the suction system, and accordingly, the work efficiency of the microfilm camera or reader is maintained high. Further, since the film is in contact with the soft cushion sheet when it is fed, the film is protected from scratches.

DESCRIPTION OF THE PREFERRED EMBODIMENT

Now the present invention will be described in detail with reference to a particular embodiment thereof referring to FIGS. 1 to 4.

Figure 1:
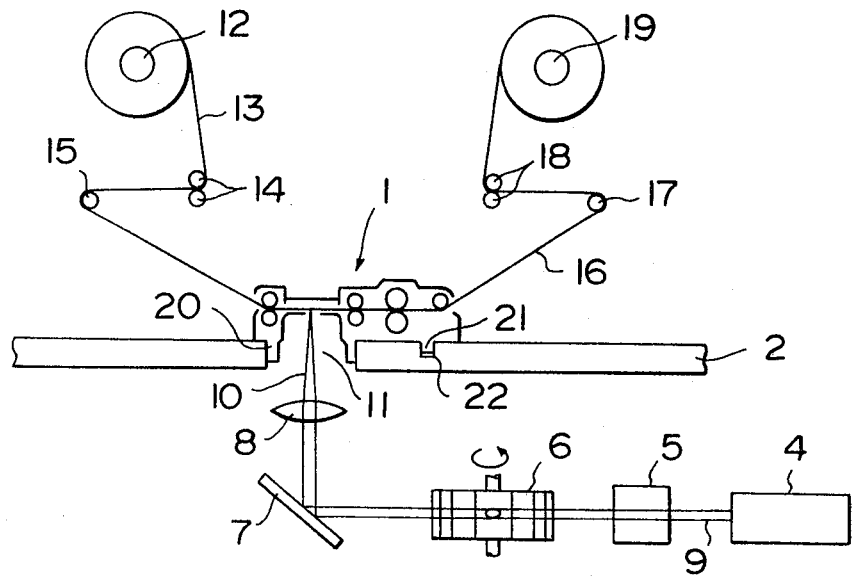
FIG. 1 is a schematic side view showing the structure of a microfilm camera in which the film holding device of this invention is incorporated.

FIG. 1 is a schematic side view of a microfilm camera or a laser COM in which the film holding device of this invention is incorporated. The laser COM stands for Computer Output Microfilmer and is a microimage recording system connected to an electronic computer in which the output of the electronic computer is recorded on a microfilm by use of a laser beam scanning system. In this specification, the term microfilm camera reads on the laser COM and other microfilm recording systems in which an optical image is recorded on a microfilm.

In FIG. 1, a camera portion is provided on a base board 2 and a laser beam scanning system is provided under the base board 2. The laser beam scanning system is composed of a laser source 4, a light modulator 5, light deflectors 6 and 7, and a focusing lens 8. In the laser beam scanning system a laser beam 9 emitted by the laser source 4 is modulated by the light modulator 5 and two-dimensionally deflected by the light deflectors 6 and 7 and then focused to a converging light flux 10 focusing to a minute light spot by the lens 8. The converging light flux 10 is caused to scan on a microfilm held on a focal plane through an opening or aperture 11 of the base board 2. The laser beam scans over one frame of the film. In the camera portion, on the other hand, a microfilm 13 wound on a feed-out core 12 is guided into the film holding device 1 by way of a pair of rollers 14 and a dancer roller 15, and the microfilm 16 having been recorded with microimages is wound up on a take-up core 19 by way of a dancer roller 17 and a pair of rollers 18. In FIG. 1, other mechanisms necessary for feed-out and take-up of the microfilm like motors are omitted for simplification. The film holding device 1 is provided on the lower face thereof with projections 20 and 21 which are engaged with the opening 11 and a hole 22 of the base board 2 and firmly fixed thereto.

Figure 2:
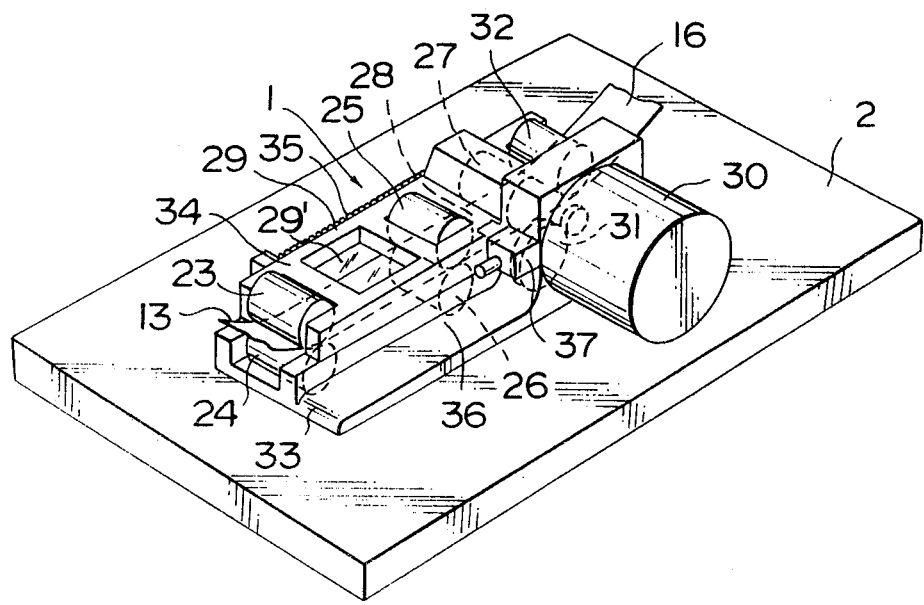
FIG. 2 is a perspective view of the film holding device of this invention.

Now the film holding device will be described in detail referring to FIG. 2. The film holding device 1 is provided with a take-in roller pair 23, 24 for taking therein a recording film 13 having a width of 16 mm for instance and further with feed-out roller pairs 25,26 and 27,28 to nip and hold the film 13 therebetween. A film support plate 29 is provided between these roller pairs 23,24 and 25,26 to support the film 13 on the lower face thereof. The film support plate 29 may be provided at the center thereof with a transparent plate 29' like a glass plate as shown in FIG. 2. A drive motor 30 is provided on the film holding device 1 to drive the roller 28 by way of a gear train 31 for feeding the film 13 nipped between the roller pair 27,28 by a predetermined length. A guide roller 32 is provided downstream the feed-out roller pairs 25,26 and 27,28 for guiding out the film 16 having been recorded with microimages.

The above described film holding device 1 may be divided into a body portion 33 and a cover portion 34 as shown in FIG. 2. In this case, the rollers 24, 26 and 28, the motor 30 and the gear train 11 are mounted on the body portion 33, and the rollers 23, 25, 27 and 32 and the film support plate 29 are mounted on the cover portion 34. One side of the body portion 33 and the cover portion 34 is hinged so that the cover portion 34 is able to be opened upward. The cover portion 34 is spring urged to be opened by a spring 35 and is opened upward from the boundary 36 between the cover and body. There is provided a latch 37 for holding the cover portion 34 in its closed position engaged with the body portion 33.

In operation, the cover portion 34 is opened upward by pulling the latch 37 and the recording film 13 is mounted on the body portion 33. Then, the cover portion 34 is closed on the body portion 33 and is locked in its closed position by the latch 37.

Figure 3:
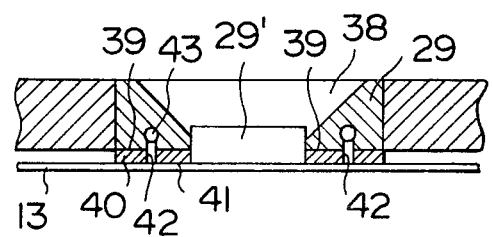
FIG. 3 is an enlarged vertical sectional view of the film support plate of the film holding device of this invention as shown in FIG. 2.
Figure 4:
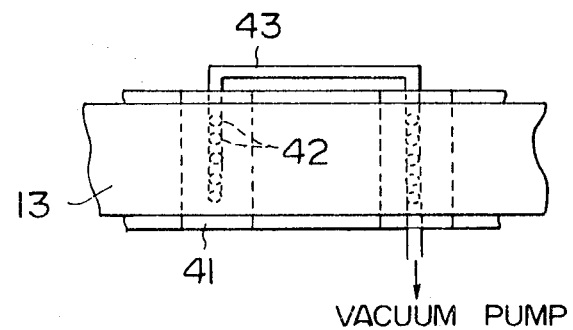
FIG. 4 is an enlarged bottom view of the film support plate of the film holding device of this invention as shown in FIG. 2.

Referring to FIGS. 3 and 4 the film support plate 29 of the film holding device 1 shown in FIG. 2 will be described in detail. The film support plate 29 is provided with an aperture 38 at the center thereof in which said transparent plate 29' is mounted. The aperture 38 and the transparent plate 29' are provided for monitoring the recorded information on the microfilm 13 by way of a monitoring device provided thereabove. Accordingly, in case that the monitoring device is not provided in the system, these aperture 38 and the transparent plate 29' are unnecessary. Further, the film support plate 29 is provided with a standard surface 39 on the lower face thereof. When there is provided the monitoring device, the standard surface 39 is provided upstream and downstream the frame to be recorded with the microimage or computer output information and provides a standard for the location of the film 13. The standard surface 39 is, however, not the focal plane of the optical system for recording the microimage on the film. The standard surface 39 is provided with a cushion sheet 40 which has a surface 41 to be put into contact with the microfilm 13. The surface 41 of the cushion sheet 40 is on the focal plane of the optical system. The cushion sheet 40 is provided with suction holes 42 open to the contact surface 41. The film support plate 29 is provided with ducts 43 communicated with the suction holes 42 to connect the suction holes 42 to a vacuum pump (not shown). Therefore, upon operation of the vacuum pump, the film 13 is attracted by the suction holes 42 and held on the contact surface 41 of the cushion sheet 40.

The cushion sheet 40 has a soft elastic and gentle surface which will not scratch the surface of the film 13 and which supports the film 13 flat on the focal plane. Further, the cushion sheet 40 has a drafty surface which allows a draft between the film 13 and itself when the film is being sucked onto the surface by suction. The cushion sheet 40 should have such a softness at the surface thereof that any dust (having a diameter of not more than 10 μm generally) will not scratch the surface of the film when the dust is interposed between the film and the surface of the cushion sheet 40. Further, the cushion sheet 40 should have such a drafty surface that the film can easily be fed while the film is attracted onto the cushion sheet by suction. In addition, the cushion sheet should not be so much deformed when it is pressed in order to maintain the film 13 on the focal plane or within the focal depth (e.g. 50 μm) of the optical system of the recording system.

As the cushion sheet satisfying the above requirements can be used a fibrous sheet material which is not deformed more than 50 μm in the thickness like an artificial leather ("Ecsaine" made by Toray K.K. for instance) or chamois.

In case that the aperture 38 for monitoring is not provided, the standard surface 39 extends throughout the film 13 at the area to be recorded with the microimage. Therefore, the cushion sheet 40 may also extend all over the area on the standard surface 39.

In operation of the laser COM employing the film holding device 1 of the present invention, the vacuum pump is first started to suck the film 13 on the contact surface 41 of the cushion sheet 40 and hold the film 13 thereon. Since the contact surface 41 is substantially on the focal plane as mentioned before, the film 13 is held on the focal plane of the optical recording system of the laser COM. At this stage, the laser beam scanning system records a microimage or output of the computer on the microfilm 13. When recording of one frame of microimage has been completed, the motor 30 rotates and drives the feed roller 28 by a predetermined angle to feed the film 13 by one frame. During the film feed, the vacuum pump is not stopped and the suction is not cut out. Since the force of suction is controlled or selected to be large enough to hold the film 13 flat on the focal plane and small enough to allow the feed of the film, the film 13 is fed on by one frame without turning off the suction system. Then, the next frame is brought to the station where it is recorded with the microimage by the laser beam scanning system.

Thus, in accordance with the film holding device of this invention the film can be fed without stopping the suction system and accordingly the work efficiency of the microimage recording system is not lowered. Further, since the film is fed in slide contact with the soft cushion sheet, the film is not scratched. In addition, it will be understood that the film holding device of this invention is advantageous in that the dust on the film can be removed away from the recording station by suction as well as can be removed by the friction with the cushion sheet, and accordingly, the surface of the film can be made clean all the time.

We claim:

1. A device for holding a film on a focal place of an optical system comprising a film support plate having a standard surface parallel to the focal plane, a cushion sheet provided on and covering substantially all the standard surface of the film support plate, an aperture provided in said support plate and said cushion sheet, said cushion sheet having a soft, elastic and drafty surface and suction holes open to the surface thereof, said surface of the cushion sheet forming the focal plane of the optical system, and a suction means for sucking air through said suction holes and thereby attracting the film onto the surface of the cushion sheet with a suction force large enough to hold the film flat on the surface of the cushion sheet and small enough to allow the film to be fed in slide contact with the surface of the cushion sheet while the suction force is maintained substantially unchanged.

2. A device for holding a film on a focal plane of an optical system as defined in claim 1 wherein said cushion sheet is made of an artificial leather having a fibrous surface like chamois.

3. A device for holding a film on a focal plane of an optical system as defined in claim 1 wherein said cushion sheet has such elasticity that the surface thereof is not deformed or displaced more than 50 μm.

4. An apparatus for transporting film and for holding the transported film on a focal plane of an optical system comprising:
   a film support plate having a standard surface parallel to the focal plane;
   a cushion sheet provided on the standard surface of the film support plate, said cushion sheet having a soft, elastic and drafty surface and suction holes open to the surface thereof, said surface of the cushion sheet forming the focal plane of the optical system;
   suction means for sucking air through said suction holes and thereby attracting the film onto the surface of the cushion sheet with a predetermined suction force large enough to hold the film flat on the surface of the cushion sheet; and
   film advancing means for incrementally advancing film over said cushion sheet by predetermined distances, said film advancing means when advancing film exerting a greater lateral force on the film than the predetermined suction force.

5. An apparatus according to claim 4 wherein said cushion sheet is made of an artificial leather having a fibrous surface like chamois.

6. An apparatus according to claim 4 or 5 wherein said cushion sheet has such elasticity that the surface thereof is not deformed or displaced more than 50 μm.

7. An apparatus according to claim 4 or 5 wherein said film support plate is provided with an aperture for monitoring having a transparent plate mounted therein.

8. An apparatus according to claim 4, wherein said cushion sheet is made of an artificial leather having a fibrous surface like chamois, said cushion sheet having such elasticity that the surface thereof is not deformed or displaced more than 50 μm, said apparatus further comprising a body portion supporting the film support plate, and a cover portion hingedly connected at one end to said body portion, said cover portion being movable away from said body portion to facilitate insertion of film between the body portion and the cover portion and being movable to a position in which the cover portion is held in engagement with the body portion.

* * * * *